United States Patent
Eliasson et al.

(10) Patent No.: US 12,310,297 B2
(45) Date of Patent: May 27, 2025

(54) HARVESTING HEAD FOR LENGTH DETERMINATION OF A TREE TRUNK AND AN ASSOCIATED METHOD

(71) Applicant: Log Max AB, Grangärde (SE)

(72) Inventors: Mikael Eliasson, Borlänge (SE); Henrik Persson, Gävle (SE)

(73) Assignee: Log Max AB, Grangärde (SE)

( * ) Notice: Subject to any disclaimer, the term of this patent is extended or adjusted under 35 U.S.C. 154(b) by 689 days.

(21) Appl. No.: 17/770,407

(22) PCT Filed: Nov. 13, 2020

(86) PCT No.: PCT/SE2020/051088
§ 371 (c)(1),
(2) Date: Apr. 20, 2022

(87) PCT Pub. No.: WO2021/096415
PCT Pub. Date: May 20, 2021

(65) Prior Publication Data
US 2022/0386542 A1 Dec. 8, 2022

(30) Foreign Application Priority Data
Nov. 15, 2019 (SE) .................................... 1951316-7

(51) Int. Cl.
*A01G 23/08* (2006.01)
*A01G 23/095* (2006.01)
(Continued)

(52) U.S. Cl.
CPC ............ *A01G 23/08* (2013.01); *A01G 23/095* (2013.01); *G01B 5/0035* (2013.01); *G01B 15/02* (2013.01); *G01S 13/88* (2013.01); *G01B 11/04* (2013.01)

(58) Field of Classification Search
None
See application file for complete search history.

(56) References Cited

U.S. PATENT DOCUMENTS

2009/0095377 A1 4/2009 Barker
2010/0027034 A1 2/2010 Havimäki
(Continued)

FOREIGN PATENT DOCUMENTS

EP 3004795 A1 4/2016
SE 1730010 A1 7/2018
(Continued)

OTHER PUBLICATIONS

Swedish Search Report mailed Apr. 17, 2020, for priority Swedish Patent Application No. 1951316-7.
(Continued)

*Primary Examiner* — Jared O Brown
(74) *Attorney, Agent, or Firm* — Renner, Otto, Boisselle & Sklar, LLP.

(57) ABSTRACT

A tree harvesting head for a tree harvesting machine, wherein the tree harvesting head comprises at least one cutting device, at least two feed wheels and a radar device. The radar device comprises at least one radar transmitter antenna arranged to transmit a signal to a tree trunk to be measured, at least two radar receiver antennas arranged to receive a radar signal reflected in at least a first and a second location in response to the transmitted radar signal, wherein the first and second locations are different locations. The radar device further comprises a device for obtaining characteristics related to the tree trunk based on the signal(s) reflected at the first and second locations. The device for obtaining characteristics related to the tree trunk is arranged to determine a tree trunk signature of a tree trunk segment located at the first location, to identify the determined tree trunk signature when the tree trunk segment has travelled to the second location and to determine a length of the tree trunk based thereon.

19 Claims, 10 Drawing Sheets

(51) Int. Cl.
*G01B 5/00* (2006.01)
*G01B 11/04* (2006.01)
*G01B 15/02* (2006.01)
*G01S 13/88* (2006.01)

(56) References Cited

U.S. PATENT DOCUMENTS

| | | | | |
|---|---|---|---|---|
| 2020/0205356 A1* | 7/2020 | Needham | ............. | A01G 23/083 |
| 2021/0324998 A1* | 10/2021 | Savolainen | ........... | A01G 23/083 |
| 2021/0360880 A1* | 11/2021 | Oinonen | ............. | A01G 23/083 |

FOREIGN PATENT DOCUMENTS

| | | | | |
|---|---|---|---|---|
| SE | 1750520 A1 | 11/2018 | | |
| WO | 1993022900 A1 | 11/1993 | | |
| WO | WO-9322900 A1 * | 11/1993 | ........... | A01G 23/095 |
| WO | 2006092469 A1 | 9/2006 | | |
| WO | 2006126952 A2 | 11/2006 | | |
| WO | 2012087220 A1 | 6/2012 | | |

OTHER PUBLICATIONS

International Search Report and Written Opinion mailed Dec. 22, 2020, for priority International Patent Application No. PCT/SE2020/051088.

* cited by examiner

HARVESTING HEAD FOR LENGTH DETERMINATION OF A TREE TRUNK AND AN ASSOCIATED METHOD

This application is a national phase of International Application No. PCT/SE2020/051088 filed Nov. 13, 2020, which claims priority to Swedish Application No. 1951316-7 filed Nov. 15, 2019, the entire disclosures of which are hereby incorporated by reference.

TECHNICAL FIELD

The present disclosure relates to a tree harvesting head for a tree harvesting machine, a tree harvesting machine and to a method for determining the length of a tree trunk.

BACKGROUND ART

One of the main objectives of a tree harvesting machine and a tree harvesting head is to cut tree trunks into certain lengths and at the same time to produce as much usable wood as possible. The length of a tree trunk to be cut is determined by a length measurement device which typically is located in the tree harvesting head of the harvesting machine.

Such a tree harvesting head comprises feed wheels for feeding the tree trunk in the longitudinal direction of the tree trunk and a cutting device for cutting the tree trunk into desired lengths. The length measurement device comprises a mechanical wheel of metal which is arranged to roll in the longitudinal direction onto the tree trunk to be measured and cut. A sensor is connected to the wheel and is arranged to determine the number of turns that the wheel has travelled onto the tree trunk. The number of turns is then transmitted to a control system of the tree harvesting machine where it is converted into the length of the tree trunk.

By such a length measurement device, it is very important that the force exerted by the mechanical wheel onto the tree trunk is kept as constant as possible thereby enabling a uniform penetration into the tree trunk. Even a small difference in penetration give rise to a large difference of the length measured. In addition, also other factors affect the measurement result, such as species of the tree to be cut, shape of the mechanical wheel, shape of the teeth of the wheel which changes as they are wear out, temperature of the tree trunk etc.

Hence, such length measurement device does not provide a sufficiently accurate value of the tree trunk length. In order to compensate for inaccurate length measurements of a tree trunk, a length margin is added to each tree trunk to be cut. The length margin added to each tree trunk results in a loss of several percent of the wood which corresponds to in the order of hundreds of thousands of cubic meters of wood in Sweden alone each year.

There is thus a need for an improved solution for length measurement of a tree trunk.

SUMMARY OF THE INVENTION

An object of the present disclosure is to provide a solution for tree trunk length measurement wherein some of the above identified problems are mitigated or at least alleviated.

The disclosure proposes a tree harvesting head for a tree harvesting machine, wherein the tree harvesting head comprises at least one cutting device, at least two feed wheels and a radar device. The radar device comprises at least one radar transmitter antenna arranged to transmit a signal to a tree trunk to be measured, at least one radar receiver antenna arranged to receive a radar signal reflected in at least a first and a second location in response to the transmitted radar signal, wherein the first and second locations are different locations. The radar device further comprises means for obtaining characteristics related to the tree trunk based on the signal(s) reflected at the first and second locations. The means for obtaining characteristics related to the tree trunk is arranged to determine a tree trunk signature of a tree trunk segment located at the first location, to identify the determined tree trunk signature when the tree trunk segment has travelled to the second location and to determine a length of the tree trunk based thereon.

An advantage of the use of radar for length measurement is that it is a contactless measurement method, which means that the length measurement device is not in physically contact with the tree trunk to be measured.

Moreover, since the method is contactless, a length measurement device using radar does not wear out as quickly as if the length measurement device is in contact with the tree trunk, which is the case when using a length measurement device comprising a mechanical wheel which is arranged to travel/roll in the longitudinal direction onto the trunk to be measured.

By using a radar device for length measurement, the need for calibration of the length measurement device is not needed. This is in contrast to a length measurement device comprising a mechanical wheel wherein the measurements are affected by e.g. the species of the tree to be cut, the shape of the mechanical wheel, the temperature of the tree trunk etc.

The radar device according to the present disclosure can be made very small with a volume of <10 cm$^3$. Thereby it is less space-consuming when mounted on the tree harvesting head as compared to prior art length measurement device.

The radar radiation is characteristically to no or at least to a very small extent affected by impurities such as resin, sawdust, snow and ice. Therefore, clogging of the length measurement device by resin, sawdust, snow and ice, which requires cleansing does typically not occur upon the use of a radar device.

According to some aspects, the at least one radar transmitter antenna comprises a first and a second radar transmitter antenna, and the at least one radar receiver antenna comprises a first and a second radar receiver antenna. The first receiver antenna is arranged to receive a reflected signal from the first radar transmitter antenna reflected at the first location and the second radar receiver antenna is arranged to receive a reflected signal from the second radar transmitter antenna reflected at the second location.

According to some aspects, the distance between the first radar transmitter antenna and the first radar receiver antenna is equal to the distance between the second radar transmitter antenna and the second radar receiver antenna.

According to some aspects, the angle between the first radar transmitter antenna and the first radar receiver antenna is equal to the angle between the second radar transmitter antenna and the second radar receiver antenna. In the configuration where the distance and angle between a radar transmitter antenna and its corresponding radar receiver antenna is the equal for respective radar transmitter/radar receiver pair it is easier to do a calculation of the length since the responses are more similar to each other as compared to a configuration with a mutual transmitter antenna. The measurements performed in the configuration with two separate radar transmitter antennas is hence more accurate as compared to the configuration with a mutual transmitter antenna.

According to some aspects, the at least one radar receiver antenna comprises a first and a second receiver antenna, which are each arranged to receive a reflected signal from the same radar transmitter antenna.

According to some aspects, the distance from a location onto the tree trunk to the at least two receiver antennas is determined by time of flight method.

According to some aspects, an end position of a tree trunk is determined by time of flight method. An advantage with the configuration where a radar device is used for determination of an end position, such as the root, of a tree trunk is that a radar device is less sensitive to dirt, such as bark and/or oil, as compared to prior art techniques using e.g. a photoelectric sensor.

According to some aspects, the reflected signal received in response to the transmitted signal relates to a frequency.

According to some aspects, the reflected signal received in response to the transmitted signal relates to a phase difference.

According to some aspects, the at least one radar transmitter antenna and the at least one radar receiver antenna are arranged substantially perpendicular in relation to the longitudinal direction of the tree trunk to be measured.

According to some aspects, the tree harvesting head further comprises a motor arranged to drive the at least one cutting device, and at least one motor arranged to drive the feed wheels.

The disclosure also proposes a tree harvesting head for a tree harvesting machine, wherein the tree harvesting head comprises at least one cutting device, at least two feed wheels and a radar device. The radar device comprises at least one radar transmitter antenna arranged to transmit a signal to a tree trunk to be measured, at least one radar receiver antenna arranged to receive a radar signal reflected onto the tree trunk, and means for obtaining characteristics related to the tree trunk based on the signals reflected at the tree trunk. The at least one radar transmitter antenna and the at least one radar receiver antenna are arranged substantially in parallel with the longitudinal direction of the tree trunk to be measured and the means for obtaining characteristics related to the tree trunk is arranged to determine a phase difference of the reflected signals received in response to the transmitted signal and to determine a length of the tree trunk based thereon.

According to some aspects, the tree harvesting head further comprises a motor arranged to drive the at least one cutting device, and at least one motor arranged to drive the feed wheels.

The disclosure also proposes a tree harvesting machine having a crane arm, wherein the crane arm comprises a tree harvesting head arranged at a free end of the crane arm.

According to some aspects, the means for obtaining characteristics of the tree trunk comprises at least one processor arranged in the tree harvesting head and/or in the tree harvesting machine arranged to determine the length of the tree trunk.

According to some aspects, the processor is arranged to record information relating to a signal segment reflected at the first location and received by the at least one radar receiver antenna, compare the recorded signal segment with the signal reflected at the second location. When the first reflected signal segment corresponds to the second reflected signal, it corresponds to the same location onto the tree trunk, and determine the length of the tree trunk based on said comparison.

According to some aspects, the recorded information relating to the reflected signal segment relates to a phase difference and/or a time difference and/or a frequency.

According to some aspects, the tree harvesting machine further comprising a control unit arranged to control the at least motor arranged to drive the at least one cutting device and/or the motor arranged to drive the at least two feed wheels based on a length measurement data obtained from the means for obtaining the length of the tree trunk.

The disclosure also proposes a method for determining the length of a tree trunk by a tree harvesting machine comprising a harvesting head, the method comprising the following steps: transmitting a radar signal to a tree trunk to be measured, receiving a radar signal reflected in at least a first and a second location in response to the transmitted radar signal, wherein the first and second locations are different locations. The method further comprises determining a tree trunk signature of a tree trunk segment located at the first location, identifying the determined tree trunk signature when the tree trunk segment has travelled to the second location, and determining a length of the tree trunk based thereon. The method corresponds to the actions performed by the tree harvesting head and tree harvesting machine as discussed above and have all the associated effects and advantages of the disclosed tree harvesting head and the tree harvesting machine.

DETAILED DESCRIPTION

Figure 1:
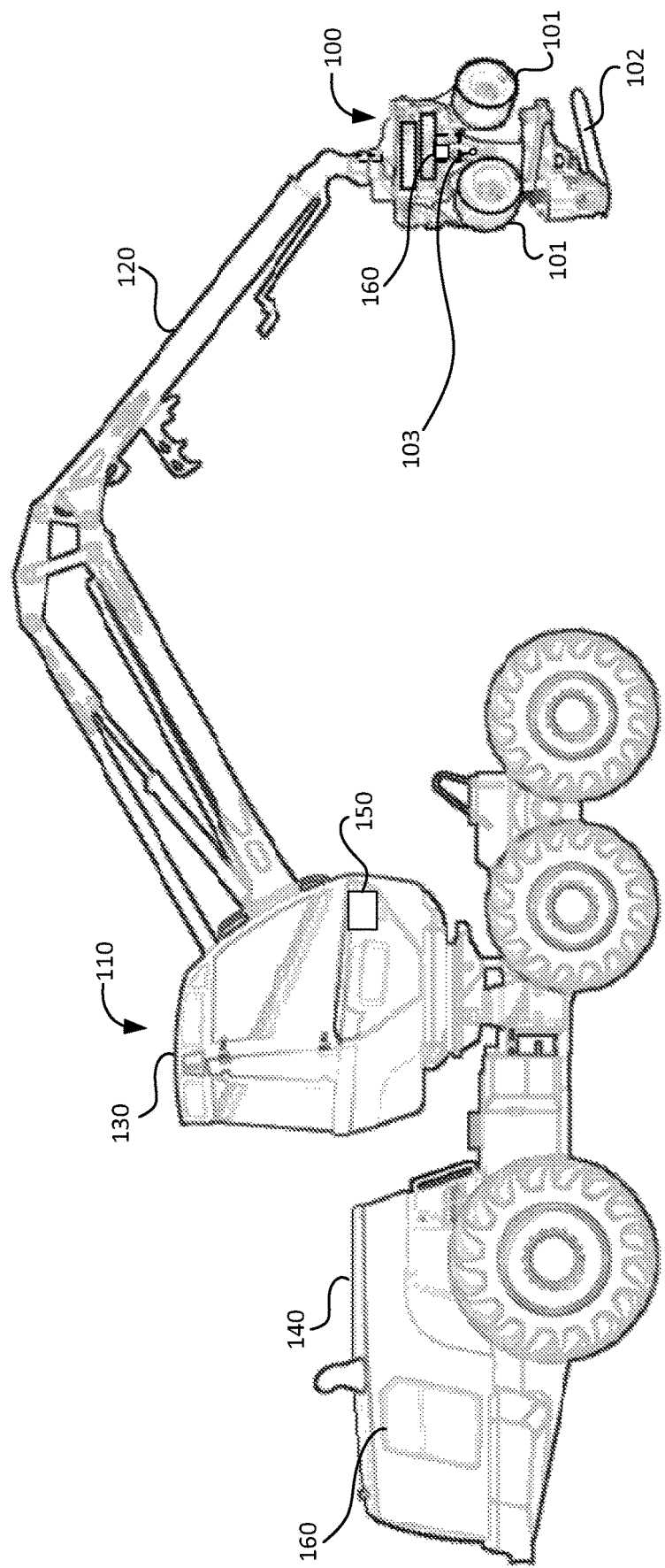
FIG. 1 illustrates an example of a tree harvesting machine according to the present disclosure.

FIG. 1 illustrates a tree harvesting machine 110 according to the present disclosure. The tree harvesting machine 110 comprises a tree harvesting head 100 arranged at a free end of a crane arm 120 of the tree harvesting machine 110. The tree harvesting head 100 is arranged to cut a tree trunk into certain lengths, and optionally also to delimb the tree trunk. The tree harvesting machine 110 may further comprise a cabin 130 for an operator and a rear part 140 in which a motor 170 for driving the harvesting machine 110 may be arranged. The tree harvesting machine 110 may also comprise a control unit 150 for control of e.g. a cutting device 102 and/or at least two feed wheels 101 of the harvesting head 100. In FIG. 1, the control unit 150 is arranged in the cabin 130 of the tree harvesting machine 110, but it may be arranged elsewhere in the tree harvesting machine 110 as well.

As shown in FIG. 1, the tree harvesting head 100 comprises at least two feed wheels 101 arranged to cooperate to feed a tree trunk (not shown) through the tree harvesting head and at least one cutting device 102 arranged to cut the tree trunk. The tree harvesting head further comprises a radar device 103. The radar device 103 comprises at least one radar transmitter antenna and at least one radar receiver antenna. The tree harvesting head further comprises means for obtaining characteristics 160 of the tree trunk. The means for obtaining characteristics 160 is arranged to determine the length of the tree trunk. The means for obtaining characteristics may possibly also be arranged for determining of other properties of the tree trunk as well, such as diameter and/or quality of the tree trunk.

Figure 2:
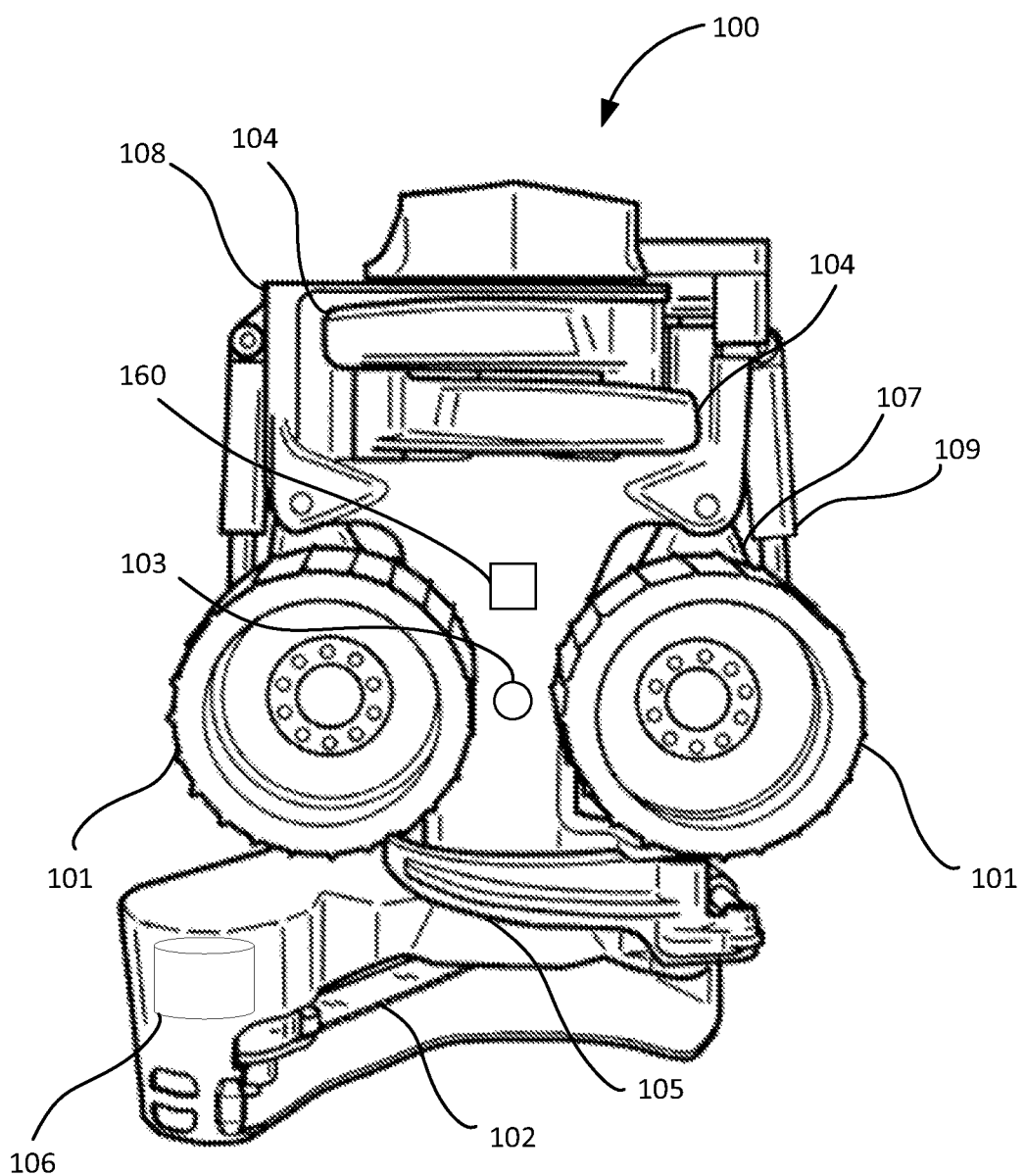
FIG. 2 is a front view of a vertically oriented tree harvesting head of a tree harvesting machine according to FIG. 1.

FIG. 2 illustrates a front view of a vertically oriented tree harvesting head 100 according to the present disclosure. The tree harvesting head 100 has a main body 108 supporting the at least two feed wheels 101. The main body 108 has further at least one cutting device 102. In the illustrated example, the main body has further a lower delimbing knife 105 and an upper pair of delimbing knifes 104. Other configurations with more or fewer or even no delimbing knives are possible.

The at least two feed wheels 101 are arranged to feed the tree trunk in the longitudinal direction of the tree trunk through the harvesting head 100. The harvesting head may further comprise at least one motor 107 arranged to drive the feed wheels and at least one motor 106 arranged to drive the at least one cutting device 102.

The tree harvesting head 100 may further comprise hydraulic cylinders 109 for adjustment of the feed wheels 101, such as pressure exerted by the feed wheels 101. The lower delimbing knife 105 and the upper pair of delimbing knifes 104 may be arranged to enclose the tree trunk and to cut off branches from the tree trunk when the tree trunk is advanced through the harvesting head 100. The at least one cutting device 102 may for example comprise a saw, saw blade and/or a cutter. The at least one cutting device may be arranged to cut the tree trunk into a certain length based on a length determination of a tree trunk by the means for obtaining characteristics 160.

The radar device 103 may be positioned anywhere before the cutting device 102 along a centre line in the feeding direction of the tree trunk direction of the harvesting head 100. In FIG. 2, the radar device 103 is located in vicinity of the two feed wheels 101. As will be discussed more in detail below, the radar device 103 comprises at least one radar transmitter antenna (not shown) arranged to transmit a radar signal to the tree trunk to be measured. The radar device 103 further comprises at least one radar receiver antenna (not shown) arranged to receive a radar signal reflected in at least a first and a second location in response to the at least one transmitted radar signal. The at least one radar transmitter antenna may be arranged to transmit a wide band of frequencies, and the at least one radar receiver antenna may be arranged to be able to choose a specific frequency to which it is listen for.

The means for obtaining characteristics 160 is in one example arranged in the tree harvesting head 100. Alternatively, the means for obtaining characteristics 160 is partly arranged in the tree harvesting head 100 and partly at another part of the tree harvesting machine 110. The means for obtaining characteristics 160 is arranged to determine the length of the tree trunk based on the signal(s) received by the at least one radar receiver antenna. The means for obtaining characteristics 160 may be physically connected to the control unit 150, thereby allowing data transmission between the means for obtaining characteristics 160 and the control unit 150. Alternatively, data transmission between the means for obtaining characteristics 160 and the control unit 150 takes place wirelessly. As a further example, the means for obtaining characteristics 160 may be integrated within the control unit 150.

The control unit 150 may be arranged to control e.g. the cutting device 102 and/or the at least two feed wheels 101 based on data received from the means for obtaining characteristics 160. The control unit 150 may be arranged in the tree harvesting machine 110, such as in the tree harvesting head 100 and/or in the rear part of the tree harvesting machine 140, and/or in the cabin 130. Alternatively, the control unit 150 may be at least partly arranged in an external unit, e.g. in a computer or smartphone. For example, when the control unit 150 is arranged in the tree harvesting machine 110, some parts of the control unit 150 may be arranged in the tree harvesting head 100 and some parts may be arranged in the cabin 130 and/or in the rear part 140 of the harvesting machine 110.

As mentioned above, the control unit 150 is arranged to control the feed wheels 101 such that the tree trunk 111 is fed to a predetermined length based on the length determination of the tree trunk by the means for obtaining characteristics 160. In one example the cutting of a tree trunk is indirectly controlled by the control unit 150, i.e. the at least one cutting device 102 is arranged to cut the tree trunk when the tree trunk fed by the feed wheels 101 is stopped in front of the at least one cutting device 102. In another alternative, not only the feeding of the tree trunk by the feed wheels 101 is controlled by the control unit 150, but also the cutting performed by the cutting device 102 is controlled by the control unit 150. In addition, the control unit 150 may control the upper delimbing knifes 104, the lower delimbing knife 105 and/or hydraulic cylinders 109 for adjusting the feed wheels 101 etc. For example, the control unit 150 may control the pressure exerted by, and/or position of the delimbing knifes 104, 105.

Figure 3:
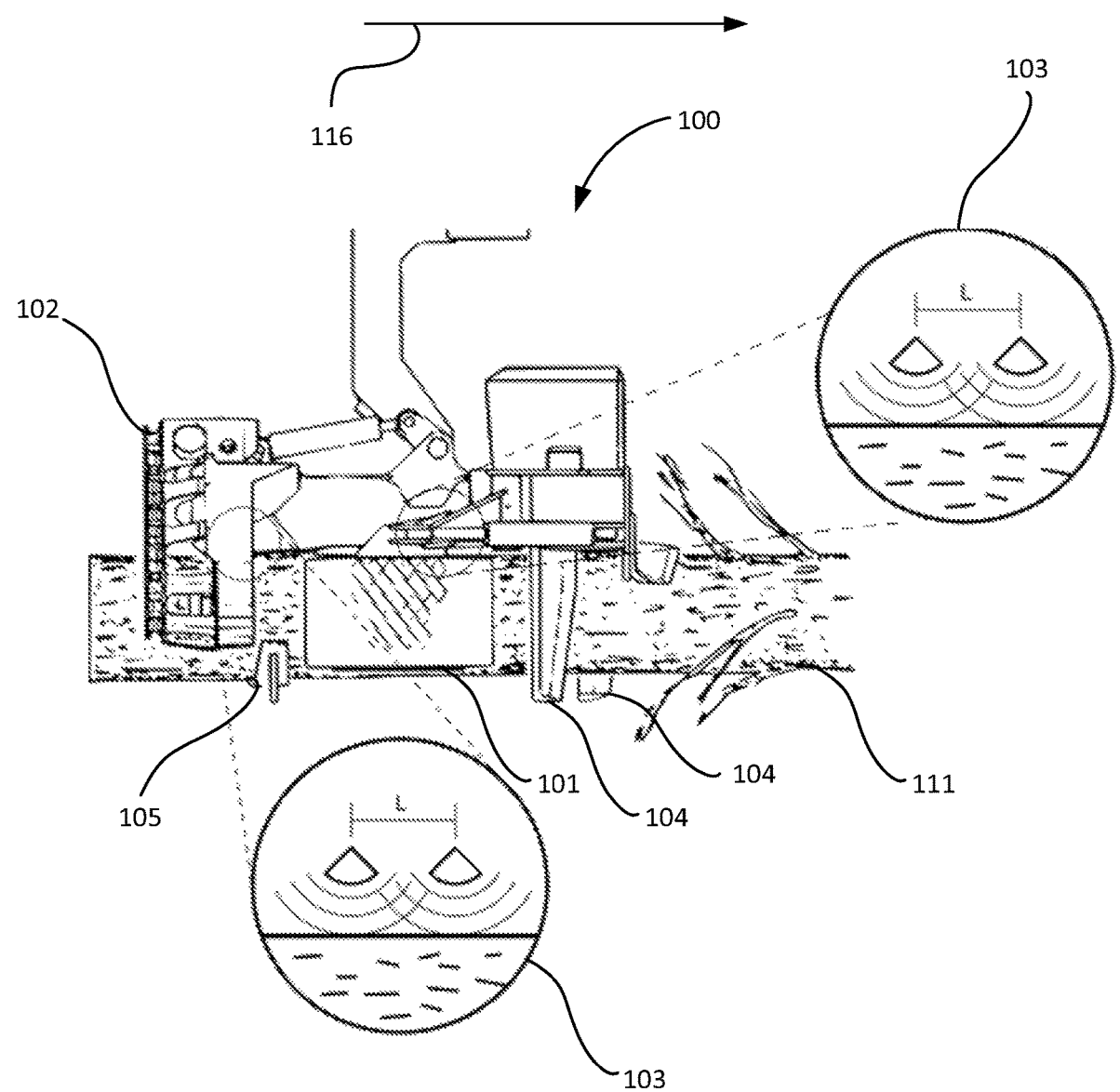
FIG. 3 is a side view of a horizontally oriented harvesting head of a harvesting machine according to FIG. 1.

FIG. 3 illustrates an example of a horizontally oriented tree harvesting head 100 gripping and processing a tree trunk 111 in the feeding direction 116 of the tree trunk. In FIG. 3, two examples of where the radar device 103 may be located is shown. In the example to the left in FIG. 3, the radar device is located in the vicinity of the cutting device 102 of the tree harvesting head 100. In the example to the right in FIG. 3, the radar device is located in vicinity of the feed wheels 101. In the examples in FIG. 3, the at least one radar transmitter antenna and the at least one radar receiver antenna of the radar device 103 are located substantially perpendicular in relation to the tree trunk 111 to be measured. Alternatively, as will be shown in an example below, the at least one radar transmitter antenna and the at least one radar receiver antenna of the radar device 103 may be located substantially in parallel with the tree trunk 111 to be measured. If the radar device 103 is located substantially in parallel with the tree trunk to be measured, the radar device 103 may for example be located in the vicinity of the cutting device 102 of the harvesting head 100, similarly to the example of the location of the radar device 103 to the left in FIG. 3.

Figure 4:
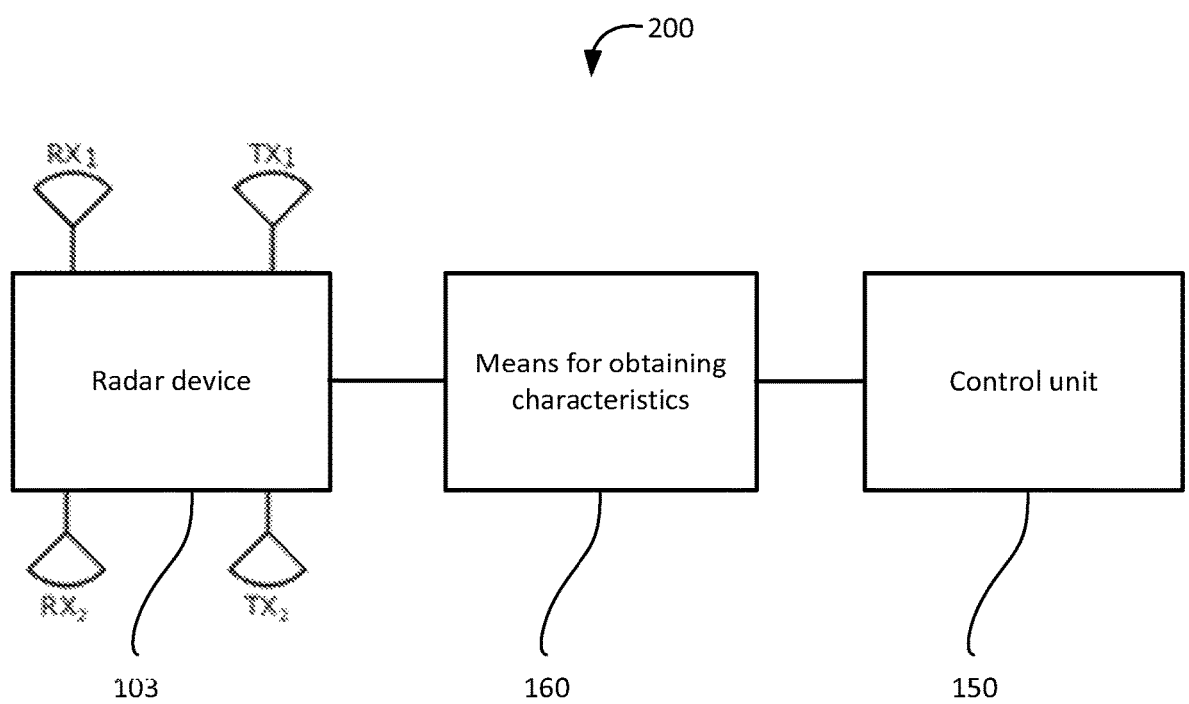
FIG. 4 is a system diagram illustrating a radar device, means for obtaining characteristics of a tree trunk and a control unit.

FIG. 4 is an example of a system 200 with a radar device 103, means for obtaining characteristics 160 of a tree trunk and a control unit 150. The radar device 103 comprises a first and a second radar transmitter antenna $TX_1$, $TX_2$, a first and a second radar receiver antenna $RX_1$, $RX_2$. In FIG. 4, two radar transmitter antennas, $TX_1$, $TX_2$, and two radar receiver antennas $RX_1$, $RX_2$ are shown. However, the number of transmitter and radar receiver antennas are shown as an example only and the system may comprise a different number of transmitter antennas and/or receiver antennas. The radar device 103 is connected to means for obtaining characteristics 160 of a tree trunk. The means for obtaining characteristics 160 is arranged to determine a length of a tree trunk. The means for obtaining characteristics 160 may further be arranged to control the transmitter antennas. For example, the frequency and/or timing of the radar signal(s) transmitted by the at least one radar transmitter antenna $TX_1$, $TX_2$ may be controlled by the means for obtaining characteristics 160.

The means for obtaining characteristics 160 comprises a processor. The processor may be arranged to record information relating to a signal segment reflected at a first location of the tree trunk and compare the recorded signal segment with the signal reflected at the second location of the tree trunk. When the first reflected signal segment corresponds to the second reflected signal it corresponds to the same location of the tree trunk. Based on the comparison, the length of the tree trunk may be determined. The data relating to the length determination of the tree trunk may be sent to the control unit 150 of the tree harvesting machine 110. The data relating to the length of the tree trunk may be sent to the control unit 150 via a databus, such as a CAN bus, or electrically via quadrature signal.

The means for obtaining characteristics 160 related to the tree trunk is arranged to determine a tree trunk signature, i.e. a fingerprint, of a tree trunk segment.

The signature of the tree trunk segment is based on comparison of one or more variables of the received signal(s) from the at least one radar receiver antenna. The variables may be a phase difference and/or a frequency and/or a time difference. The transmitted radar signal(s) and the reflected radar signal(s) are in one example a sinus signal. The signature of the tree trunk may be determined by comparing the frequency content and/or the phase content and/or the time difference of the reflected signals. In one example, the radar device 103 comprises at least one radar transmitter antenna and two radar receiver antennas. The at least one radar transmitter antenna transmits a signal towards the tree trunk to be measured. In the case of two separate radar receiver antennas, the signal received by the first radar receiver antenna $RX_1$ is recorded in the means for obtaining characteristics 160 of a tree trunk. When the same signature is registered by the second receiver antenna $RX_2$ as the signature registered by the first receiver antenna $RX_1$, it can be concluded that the tree trunk has moved from the first location to the second location. Thus, the tree trunk has then travelled a distance corresponding to the distance between the first and the second location. In order to measure a larger distance, such as a complete tree trunk, a plurality of measurements of distances between the first and second locations are performed and added to each other.

The control unit 150 may be arranged such that the lengths of a tree trunk to be cut is predetermined in the control unit 150. Such a predetermination of the length may be set in the control unit 150 by the operator. The predetermination may be based on diameter measurement(s) and/or presence of e.g. decay in the tree trunk which may be determined by the radar device 103. As an alternative, the control system 150 may be able to, based on the length, and/or diameter and/or quality of the tree trunk, to determine appropriate lengths in which the tree trunk should be cut in order to obtain as much usable wood as possible.

The unit 150 may be arranged to control the at least one motor arranged to drive the at least one cutting device 102, and/or to control the motor 107 arranged to drive the at least two feed wheels 101 based on data obtained from the means for obtaining characteristics 160 of the tree trunk. The results from the length measurements may be used by the control unit 150 for controlling the feeding of the tree trunk by the feed wheels 101 to a certain position within the harvesting head 100, for example to a position in front of the at least one cutting device 102. The results from the diameter measurement may be used by the control unit 150 for controlling the pressure exerted by, and/or the position of the upper delimbing knifes 104 and/or the lower delimbing knife 105.

As a first example, when the signature relates to a frequency, a radar signal is transmitted towards the tree trunk by the at least one radar transmitter antenna(s). The lower frequency of the transmitted radar signal, the further down in the material of the tree trunk the radar signal reaches. The frequency of the radar signal reflected by the tree trunk, i.e. the frequency which the material of the tree trunk is responding with is received by the at least one radar receiver antenna. When the signature relates to a frequency, it is possible to measure onto the surface and/or of the bulk of the tree trunk. When signature relates to a frequency, the signature may be obtained based on density, humidity, annual rings, decay of the tree trunk etc.

As a second example, when the signature relates to a phase difference, a radar signal is transmitted towards the tree trunk by the at least one transmitter antenna(s). The radar signal may have a frequency which is high enough to bounce onto the surface of the tree trunk. Hence, the radar signal will bounce onto the surface of the tree trunk and the reflected signal will be a number of phases which represents different heights of the surface of the tree trunk. The phase differences thus represent the surface structure of the material. When the signature relates to a phase difference, the surface of the tree trunk can be measured. When signature relates to a phase difference, the signature may be obtained based on the roughness of the surface of the tree trunk. Hence, the non-planar and rough surface of the tree trunk is used for the length determination.

An example of a frequency of the radar signal used upon penetration measurements, i.e. measurements into the tree trunk is <10 GHz. An example of a frequency of the radar signal used upon surface measurements, i.e. measurements when the radar signal bounces onto the surface of the tree trunk is >10 GHz.

Figure 5A:
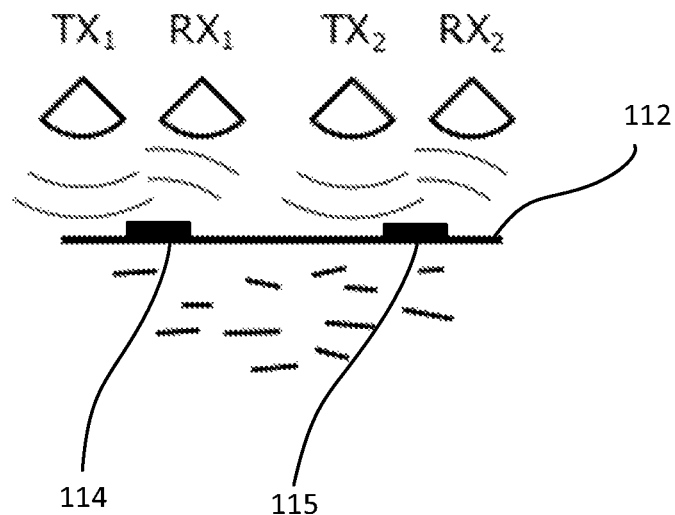
FIGS. 5a and 5b illustrate a configuration with two radar transmitter antennas and two radar receiver antennas according to two examples.
Figure 5B:
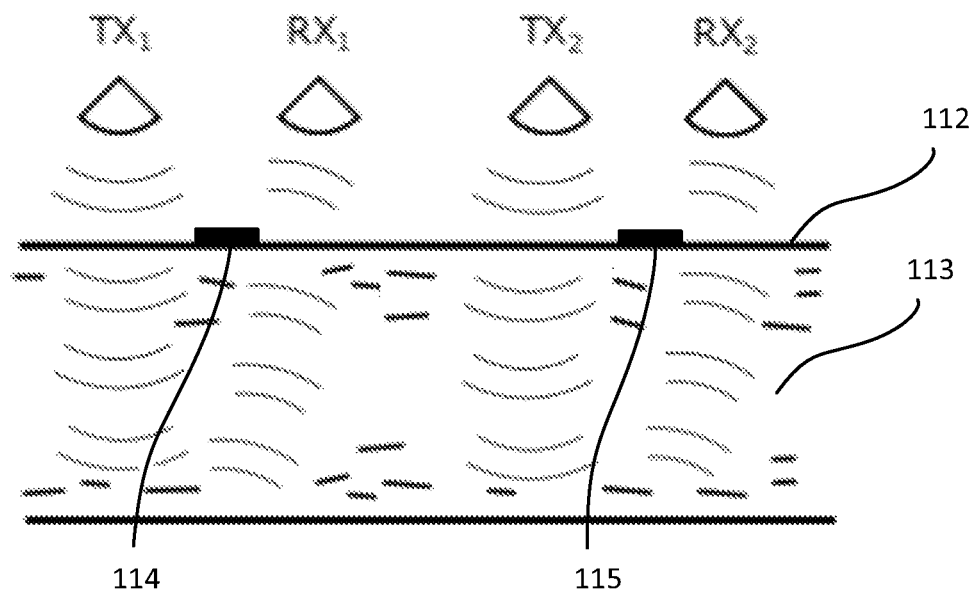

In FIG. 5a an example of a configuration with a first and a second radar transmitter antenna $TX_1$, $TX_2$, and a first and a second radar receiver antenna $RX_1$, $RX_2$ is illustrated. The first and second radar transmitter antennas $TX_1$, $TX_2$, and the first and second radar receiver antennas $RX_1$, $RX_2$ are arranged to transmit respectively receive signals to/from the tree trunk. The first radar receiver antenna $RX_1$ is arranged to only listen for signals transmitted by the first radar transmitter antenna $TX_1$ and the second radar receiver antenna $RX_2$ is arranged to only listen for signals transmitted by the second radar transmitter antenna $TX_2$. In the configuration shown in FIG. 5a, the distance and the angle between the first radar transmitter antenna $TX_1$ and the first radar receiver antenna $RX_1$ are the same as the distance and the angle between the second radar transmitter antenna $TX_2$ and the second radar receiver antenna $RX_2$. As seen in FIG. 5a, the first radar receiver antenna $RX_1$ is arranged to receive a signal segment reflected at a first location 114 determined by the geometry of the first radar transmitter antenna $TX_1$, first radar receiver antenna $RX_1$ and the tree trunk surface 112. The received signal segment corresponds to a signature and may be recorded in the processor of the means for obtaining characteristics 160. When the same signature, i.e. corresponding to a second location 115 determined by the geometry of the second radar transmitter $TX_2$, second radar receiver $RX_2$ and the tree trunk is registered by the second receiver antenna $RX_2$, the tree trunk has then travelled a distance corresponding to the distance between the first 114 and the second location 115.

In the configuration shown in FIG. 5a, the first and second radar receiver antennas $RX_1$, $RX_2$ and the first and second radar transmitter antennas $TX_1$, $TX_2$ are arranged substantially perpendicular to the tree trunk to be measured. In this configuration, the radar echo, i.e. the reflected signal received by the first and second radar receiver antennas, $RX_1$, $RX_2$ may relate to a phase difference and/or to a frequency.

Figure 5C:
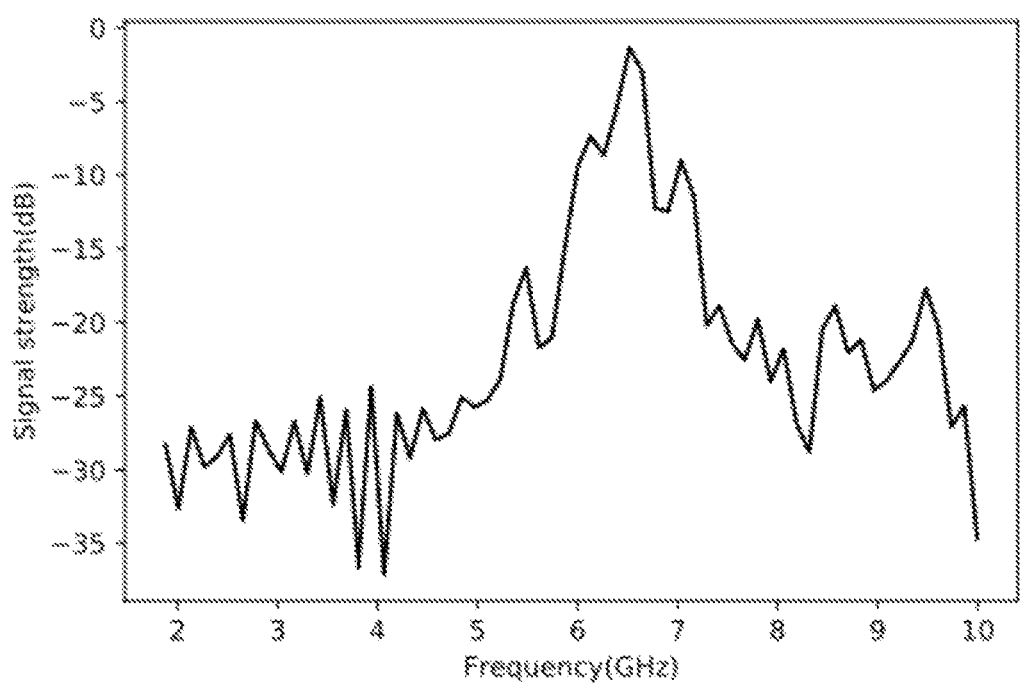
FIG. 5c illustrates an example of a signature relating to a frequency.

In FIG. 5c, an example of a signature relating to a frequency is shown. When the signature relates to the frequency, the amplitude of the reflected signal at a specific frequency is used in order to compare the signals received by the first and second radar receiver antennas $RX_1$, $RX_2$, respectively.

By the configuration illustrated in FIG. 5a, it is possible to perform measurements not only on the surface 112 of the tree trunk, but also further down into the material, i.e. in the bulk 113, of the tree trunk. Hence, in addition to length determination of the tree trunk also other properties of the tree trunk can be determined, such as decay of the tree trunk, bark thickness etc. When determining the properties of the bulk 113 of the tree trunk, the frequency of the reflected signal is measured. A change of the medium results in an echo of the transmitted signal. The reflected radar signal, i.e. echo, arises when the dielectric resistance of the material is changed, for example when the radar signal goes to the tree trunk from air, or when the radar signal goes from fresh wood to decayed wood. The larger difference in dielectric resistance, the stronger reflected radar signal is obtained. The echo when the signal goes from wood to air is thus larger than changes of the wood within the tree trunk. Thereby, it is possible to determine the diameter of a tree trunk since the echo arises both when the signal is transmitted into the tree trunk and when it is received back from the tree trunk.

As a further example, the quality of the of the tree trunk, such as decay of the tree trunk, bark thickness etc. may be determined by modern techniques, such as neural networks.

Figure 6A:
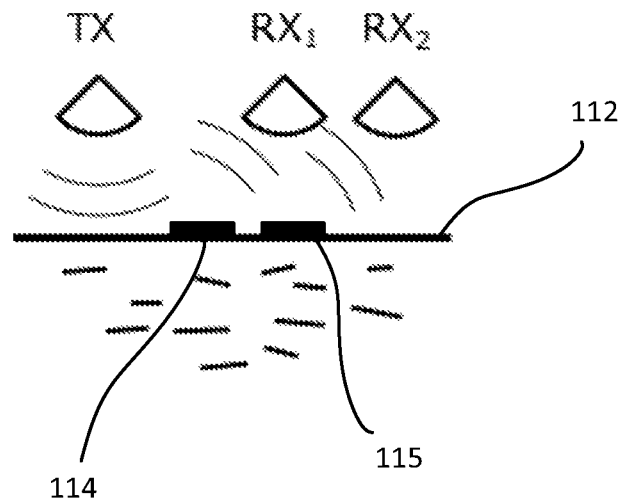
FIGS. 6a and 6b illustrate a configuration with a mutual radar transmitter antenna and two radar receiver antennas, and triangulation of the positions of the antennas for determination of a location onto a tree trunk according to an example.

In FIG. 6a, another example of a configuration comprising a mutual radar transmitter antenna, TX, and a first radar receiver antenna, $RX_1$ and a second radar receiver antenna $RX_2$ is illustrated. The mutual transmitter antenna and the first and second radar receiver antennas are arranged to transmit respectively receive signals to/from the tree trunk. In this configuration, both the first and the second radar receiver antennas $RX_1$, $RX_2$ are arranged to listen to signals transmitted by the mutual radar transmitter antenna, TX. The first radar receiver antenna $RX_1$ is arranged to receive a signal segment reflected at a first location 114 determined by the geometry of the first radar transmitter $TX_1$, first radar receiver $RX_1$ and the tree trunk. The received signal segment may be recorded in the processor of the means for obtaining characteristics 160. When the same signature, i.e. signal segment corresponding to a second location 115 determined by the geometry of the first radar transmitter $TX_1$, first radar receiver $RX_1$ and the tree trunk is registered by the second receiver antenna $RX_2$ it can be concluded that the tree trunk has moved from the first location 114 to the second location 115. Thus, the tree trunk has then travelled a distance corresponding to the distance between the first and the second location.

Figure 6B:
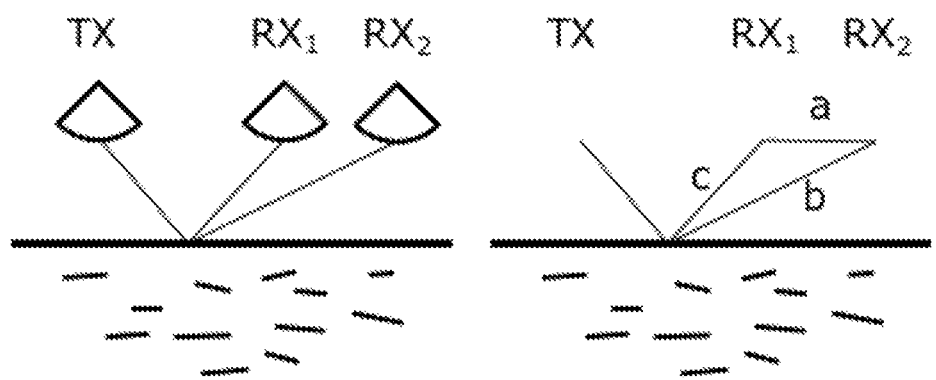

As seen in FIG. 6a, the first and second radar receiver antennas $RX_1$, $RX_2$ and the mutual radar transmitter antenna TX are arranged substantially perpendicular to the tree trunk to be measured. In this configuration, the radar echo, i.e. the received signal may relate to a phase difference. By this configuration, it is possible to perform measurements of the surface 112 of the tree trunk, such as length measurements, but not measurements of the bulk of the tree trunk. As shown in FIG. 6b, by a mutual radar transmitter antenna TX, the distance to a location onto the tree trunk can be calculated by means of time-of-flight method. Thereby the position of a location onto a tree trunk, i.e. the signature, can be calculated continuously by the means for obtaining characteristics 160 since the lengths of the three sides a, b and c of a triangle formed by the receiver antennas $RX_1$, $RX_2$ is known. The determination/calculation of the signature may be performed in the means for obtaining characteristics 160.

Figure 7:
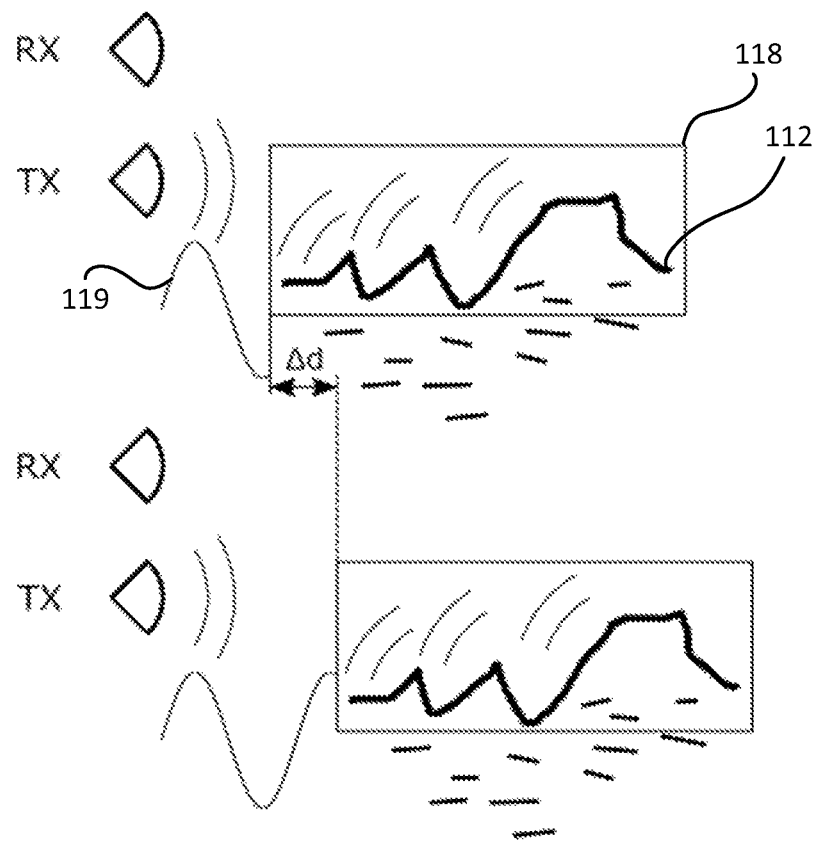
FIG. 7 illustrates a configuration with a single radar transmitter antenna and a single radar receiver antenna according to an example.

FIG. 7 illustrates yet another example of a configuration comprising a single radar transmitter antenna, TX, and a single radar receiver antenna RX. In this configuration, the radar receiver antenna RX and the radar transmitter antenna TX of the radar device 103 are arranged substantially in parallel with the longitudinal direction, i.e. along, the tree trunk to be measured. As seen in FIG. 7, radar signals are reflected at the surface structure 112 of the tree trunk in response to a radar signal transmitted by the radar transmitter antenna TX. The reflection at the surface structure takes place in surfaces which are arranged in a plane facing the radar transmitter antenna TX. In this example, the phase of the reflected radar signals received by the radar receiver antenna RX is measured.

In FIG. 7, the field of view 118 represents an area which is detected by the radar receiver antenna RX. As seen in FIG. 7, the tree trunk has moved a length Δd in the lower case in relation to the upper case. A sinus signal illustrates how the phase of the reflected radar signal is changed upon movement of the tree trunk in relation to the radar transmitter antenna TX. In the example in FIG. 7, there are three different reflected radar signals but the phase difference of the bounces of the reflected radar signals are substantially the same. However, as an example, in order to compensate for possible measurement errors, an average value for all phase differences may be calculated. In order to convert the phase difference into a length the following formula, $\Delta d = (\Delta\Phi \times \lambda)/4\pi$ may be used, where $\Delta d$ is the length, $\Delta\Phi$ is the phase difference and $\lambda$ is the wavelength of the radar signal.

The reason why $\Delta\Phi \times \lambda$ is divided by $4\pi$, and not by $2\pi$, is that the phase difference is duplicated since the radar signal is shifted with the same amount when it is reflected from the tree trunk to the radar receiver antenna RX as when it is transmitted from the radar transmitter antenna TX to the tree trunk. As mentioned above, the means for obtaining the characteristics 160 related to the tree trunk is arranged to determine the phase difference and to determine the length based thereon.

In this configuration, it is also possible to use an arrangement of a plurality of radar receiver antennas simultaneously. By the use of a plurality of radar receiver antennas an oversampling is obtained which increases the accuracy of the length measurement. Another possibility is to use a plurality of radar transmitter antennas in combination with the plurality of radar receiver antennas in order to further increase the accuracy of the measurements.

It is important to note that the example shown in FIG. 7 is not the same as the Doppler effect which is a way of measuring the velocity of a moving object. Upon measuring the Doppler effect, a signal of a frequency is transmitted from a transmitter antenna, whereby the frequency change is measured, i.e. frequency increase or frequency decrease, by a receiver antenna due to of the velocity of the moving object in relation to the transmitter antenna. Instead, in the example shown in FIG. 7, locations of the surface of the tree trunk can be followed as they approaches or moves away from the transmitter antenna are measured.

Figure 8A:
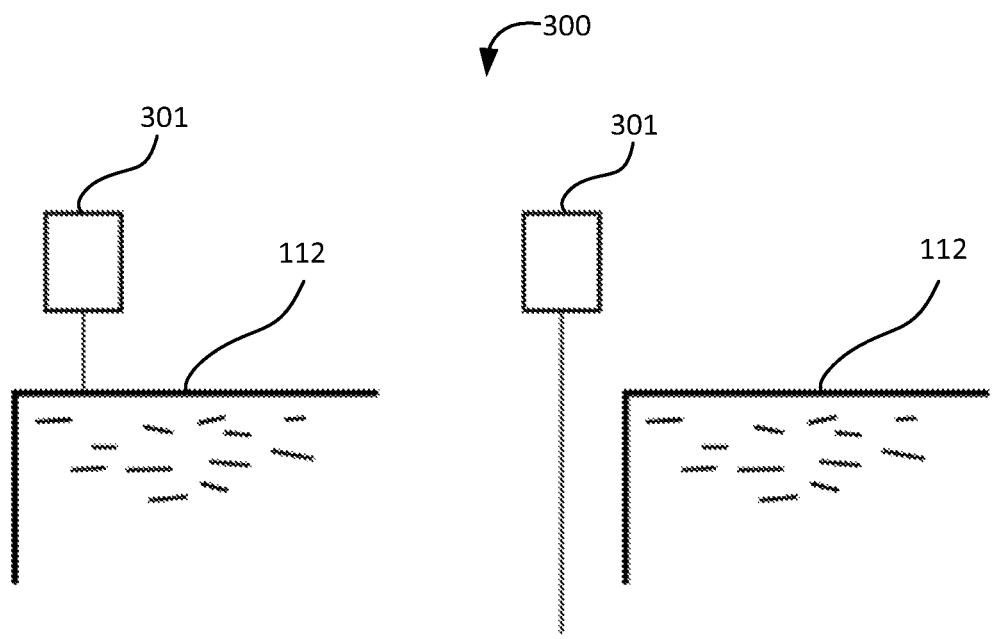
FIG. 8a illustrates a prior art method for determination of an end position of a tree trunk.

The radar device 103 discussed above may further be arranged to resetting the length measurement and/or to determine an end position of a tree trunk by determine when e.g. the root of a tree trunk passes a sensor. The principle of such sensor may be a similar to that of a photoelectric sensor. A photoelectric sensor may be arranged onto the tree harvesting head 100 in the vicinity of the cutting device 102 and may comprise of a light source arranged to emit light as a narrow light beam. In the photoelectric sensor there is also a photocell arranged for detecting incoming light. When the light detected exceeds a predetermined value as shown in FIG. 8a, the sensor is arranged to generate a high signal and when no light is reflected, a low signal is generated. The same principle for determination of the end position of a tree trunk may be performed by the use of a radar. Such a system may comprise a radar transmitter antenna and a radar receiver antenna. If a radar signal is transmitted towards a tree trunk resulting in a reflected signal from the tree trunk, it is known that the tree trunk is present in front of the radar transmitter antenna. If the transmitted signal does not result in a reflected signal, no tree trunk is present in front of the radar transmitter antenna. However the accuracy by the use of radar is <1 cm which is not accurate enough.

Figure 8B:
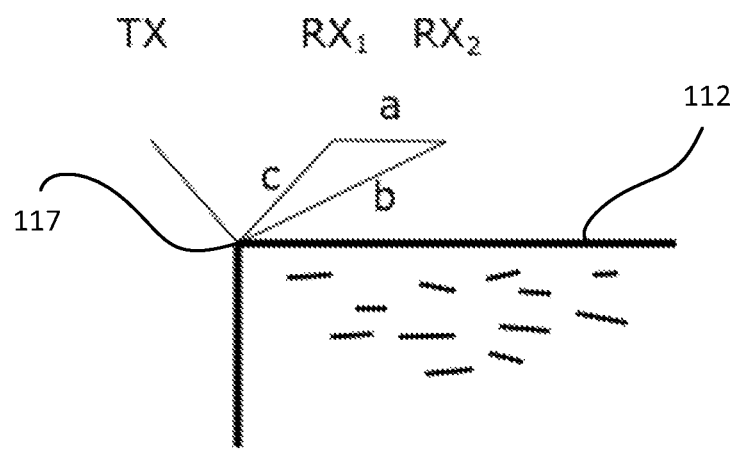
FIG. 8b illustrates a configuration with a mutual radar transmitter antenna and two separate radar receiver antennas for determination of an end position of a tree trunk according to an example.

In FIG. 8b, a configuration of a mutual transmitter antenna TX and two radar receiver antennas $RX_1$, $RX_2$ is shown. By this configuration it is possible to calculate the location onto the tree trunk from where the signal originates by triangulation in the same way as is done in the case of a mutual transmitter antenna TX and as described in the example of FIG. 6b above. In another example, it is also possible to determine where in the longitudinal direction an end position 117, e.g. the root, of tree trunk actually is located. The phase difference between the signal received by the first radar receiver antenna $RX_1$ and signal received by the second radar receiver antenna $RX_2$ is determined. Thereby the difference in length between the distance between the first radar receiver antenna $RX_1$ and the end position as well as the second radar receiver antenna $RX_2$ and the end position, i.e. the lengths b and c of the triangle in FIG. 8b is known. Since the distance a between the first radar receiver antenna $RX_1$ and $RX_2$ is known it is possible to calculate the angles of the triangle and thereby determine the end position 117 of the tree trunk. As an example, by transferring the result of the end position to the control unit 150 it may be possible to control the feeding rate of the feed wheels such that the feed rate is slowed down when the end position of the tree trunk is approaching such that the feeding is not too rapid and the tree trunk is ejected from the tree harvesting head 100.

Figure 9:
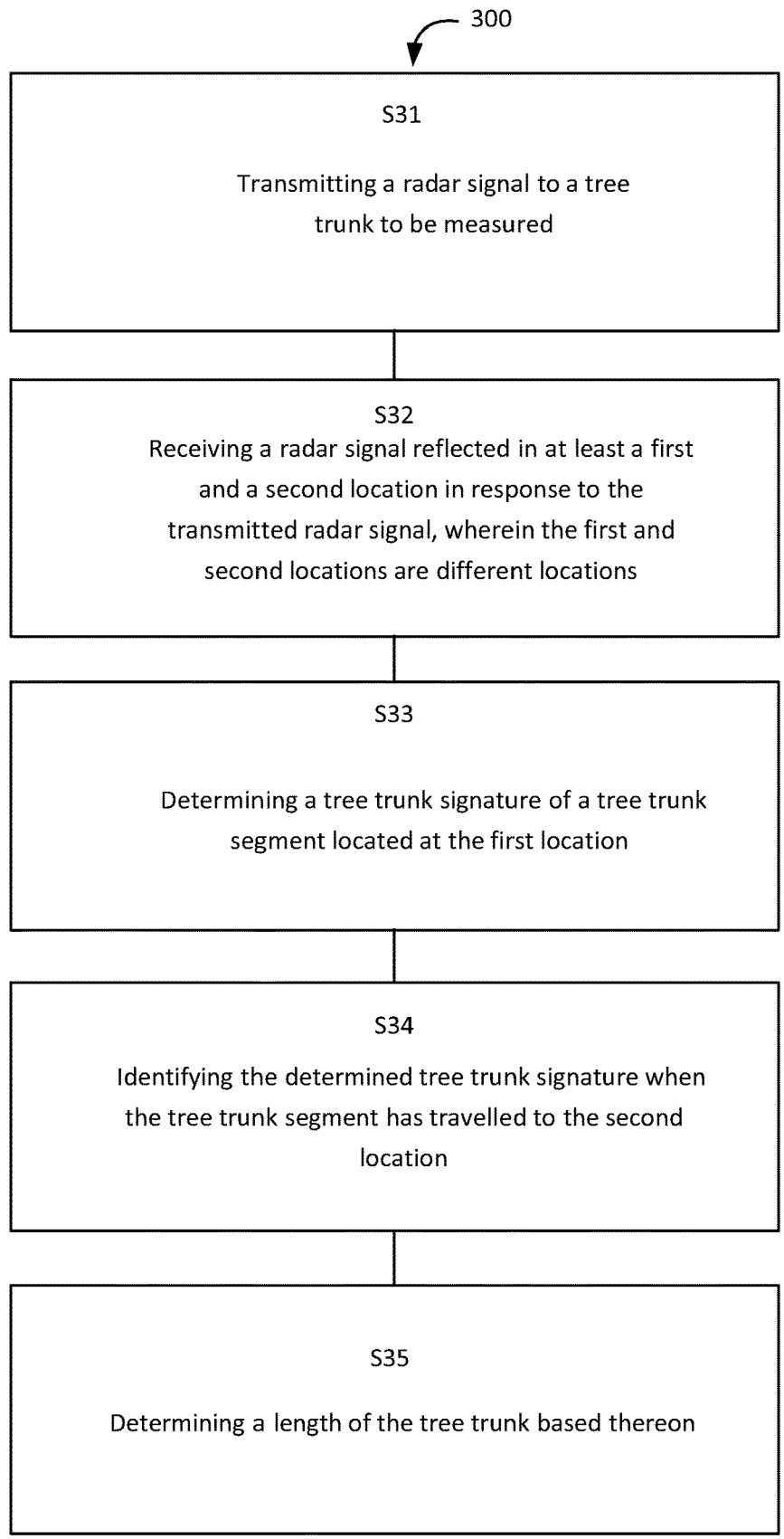
FIG. 9 is a flow diagram illustrating the method steps for determining the length of a tree trunk according to an example.

FIG. 9 illustrates the method steps of a method 300 for determining the length of a tree trunk. The method comprises transmitting a radar signal to a tree trunk to be measured (S31), receiving a radar signal reflected in at least a first and a second location in response to the transmitted radar signal (S32), wherein the first and second locations are different locations. The method further comprises determining a tree trunk signature of a tree trunk segment located at the first location (S33), identifying the determined tree trunk signature when the tree trunk segment has travelled to the second location (S34), and determining a length of the tree trunk based thereon (S35).

The invention claimed is:

1. A tree harvesting head for a tree harvesting machine, wherein the tree harvesting head comprises at least one cutting device, at least two feed wheels and a radar device, wherein that the radar device comprises at least one radar transmitter antenna arranged to transmit a signal to a tree trunk to be measured, at least two radar receiver antennas arranged to receive a radar signal reflected in at least a first and a second location in response to the transmitted radar signal, wherein the first and second locations are different locations, and means for obtaining characteristics related to the tree trunk based on each signal reflected at the first and second locations, wherein the means for obtaining characteristics related to the tree trunk is configured to determine a tree trunk signature of a tree trunk segment located at the first location, to identify the determined tree trunk signature when the tree trunk segment has travelled to the second location and to determine a length of the tree trunk based the identified tree trunk signature.

2. The tree harvesting head according to claim 1, wherein the at least one radar transmitter antenna comprises a first and a second radar transmitter antenna, and the at least two radar receiver antennas comprise a first and a second radar receiver antenna, wherein the first receiver antenna is arranged to receive a reflected signal from the first radar transmitter antenna reflected at the first location and the second radar receiver antenna is arranged to receive a reflected signal from the second radar transmitter antenna reflected at the second location.

3. The tree harvesting head according to claim 2, wherein the distance between the first radar transmitter antenna and the first radar receiver antenna is equal to the distance between the second radar transmitter antenna and the second radar receiver antenna.

4. The tree harvesting head according to claim 2, wherein the angle between the first radar transmitter antenna and the first radar receiver antenna is equal to the angle between the second radar transmitter antenna and the second radar receiver antenna.

5. The tree harvesting head according to claim 1, wherein the at least two radar receiver antennas comprise a first and a second receiver antenna, which are each arranged to receive a reflected signal from a same one of the at least one radar transmitter antenna.

6. The tree harvesting head according to claim 5, wherein a distance from a location on the tree trunk to the at least two receiver antennas is determined by time of flight method.

7. The tree harvesting head according to claim 5, wherein an end position of a tree trunk is determined by time of flight method.

8. The tree harvesting head according to claim 1 wherein each of the reflected signals received in response to the transmitted signal relate to a frequency.

9. The tree harvesting head according to claim 1, wherein each of the reflected signals received in response to the transmitted signal relate to a phase difference.

10. The tree harvesting head according to claim 1, wherein the at least one radar transmitter antenna and the at least two radar receiver antennas are arranged substantially perpendicular in relation to a longitudinal direction of the tree trunk to be measured.

11. The tree harvesting head according to claim 1, further comprising a motor arranged to drive the at least one cutting device, and at least one motor arranged to drive the feed wheels.

12. A tree harvesting head for a tree harvesting machine, wherein the tree harvesting head comprises at least one cutting device, at least two feed wheels and a radar device, wherein the radar device comprises at least one radar transmitter antenna arranged to transmit a signal to a tree trunk to be measured, at least one radar receiver antenna arranged to receive a radar signal reflected onto the tree trunk, and means for obtaining characteristics related to the tree trunk based on each signal reflected at the tree trunk, wherein the at least one radar transmitter antenna and the at least one radar receiver antenna are arranged substantially in parallel with a longitudinal direction of the tree trunk to be measured and wherein the means for obtaining characteristics related to the tree trunk is configured to determine a phase difference of the reflected signals received in response to the transmitted signal and to determine a length of the tree trunk based the phase difference.

13. The tree harvesting head according to claim 12, further comprising a motor arranged to drive the at least one cutting device, and at least one motor arranged to drive the at least two feed wheels.

14. A tree harvesting machine having a crane arm, wherein the crane arm comprises a tree harvesting head according to claim 1 arranged at a free end of the crane arm.

15. The tree harvesting machine according to claim 14, wherein the means for obtaining characteristics of the tree trunk comprises at least one processor arranged in the tree harvesting head and/or in the tree harvesting machine arranged to determine the length of the tree trunk.

16. The tree harvesting machine according to claim 15, wherein the at least one processor is configured to
record information relating to a signal reflected at a first location and received by the at least one radar receiver antenna,
compare the recorded information with a signal reflected at a second location, and when the signal reflected at the first location corresponds to the signal reflected at the second location, the signal reflected at the first location and the signal reflected at the second location correspond to a same location on the tree trunk, and
determine the length of the tree trunk based on said comparison.

17. The tree harvesting machine according to claim 16, wherein the recorded information relating to the reflected signal at the first location relates to a phase difference and/or a time difference and/or a frequency.

18. The tree harvesting machine according to claim 14, further comprising a control unit arranged to control at least one motor arranged to drive the at least one cutting device and/or at least one motor motor arranged to drive the at least two feed wheels based on a length measurement data obtained from the means for obtaining the characteristics of the tree trunk.

19. A method for determining a length of a tree trunk by a tree harvesting machine comprising a harvesting head according to claim 1, the method comprising the following steps:
transmitting a radar signal to a tree trunk to be measured,
receiving a radar signal reflected in at least a first and a second location in response to the transmitted radar signal, wherein the first and second locations are different locations,
determining a tree trunk signature of a tree trunk segment located at the first location,
identifying the determined tree trunk signature when the tree trunk segment has travelled to the second location, and
determining the length of the tree trunk based the identified tree trunk signature.

* * * * *